No. 12,721. REISSUED NOV. 19, 1907.

A. ENGLEFIELD.

BOOK REST AND THE LIKE.

APPLICATION FILED JULY 5, 1907.

Witnesses:
P. F. Sauck.
A. S. Cranberg

Inventor
Arthur Englefield
By his Attorneys
Fairbanks & Co.

THE NORRIS PETERS CO., WASHINGTON, D. C.

UNITED STATES PATENT OFFICE.

ARTHUR ENGLEFIELD, OF LONGFORD, NEAR GLOUCESTER, ENGLAND.

BOOK-REST AND THE LIKE.

No. 12,721. Specification of Reissued Letters Patent. Reissued Nov. 19, 1907.

Original No. 847,052, dated March 12, 1907, Serial No. 292,449. Application for reissue filed July 5, 1907. Serial No. 382,421.

*To all whom it may concern:*

Be it known that I, ARTHUR ENGLEFIELD, a subject of the King of Great Britain and Ireland, and residing at Longford, near Gloucester, England, have invented certain new and useful Improvements in Book-Rests and the Like, of which the following is a specification.

My present invention relates to supports for books, drawing-boards, and the like, and has for its object the construction of a support which will be simple and efficient in operation and inexpensive to manufacture.

A further object of my invention is to provide a rest for drawing-boards, periodicals, books, and the like which will support them on a flat surface, such as a desk or table, at a suitable angle for the work in hand, or where a sloping desk or table is employed the rest may be adjusted to a horizontal position.

The invention comprises a support or rest for a book or other object constructed in any desirable form and of any suitable material. One side of this support is provided with a dovetail fillet which is engaged by a suitable bracket having a groove or channel formed therein. The groove or channel is adapted to receive the dovetail member and is of a size to permit the dovetail member to slide freely therein for the purpose of adjusting the support.

I will now proceed to describe my invention with reference to the accompanying drawings and then point out the distinctive features of my invention in the annexed claims.

Figure 1:
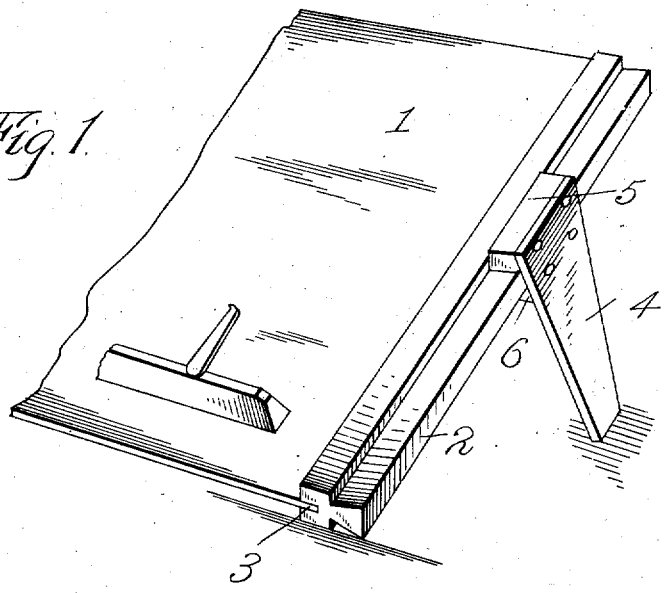
Figure 2:
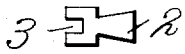
Figure 3:
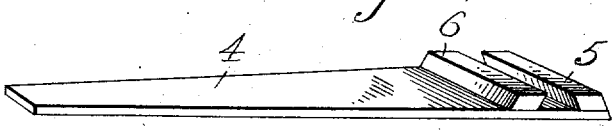
Figure 4:
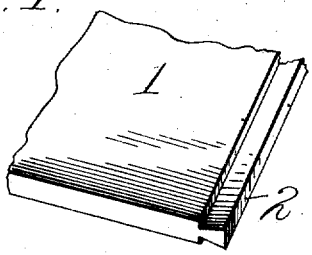
Figure 5:
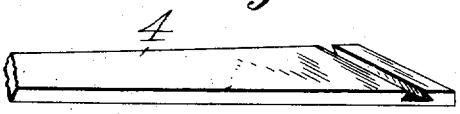

Figure 1 is a view in perspective of my improved rest or support. Fig. 2 is an end view of the dovetailed fillet which is attached to the work-supporting member. Fig. 3 shows a form of bracket which I employ and the method of forming the groove for the reception of the dovetailed member. Fig. 4 shows a modification of the support 1, in which the edge of the support is dovetailed and the supplemental dovetailed member thereby dispensed with. Fig. 5 is a modified form of bracket in which the groove or channel is formed in the bracket parallel with the upper edge thereof.

Like reference-numerals refer to like parts throughout the specification.

1 is a support for a book or the like, herein shown in the form of a parallelogram, which may be made of wood or any other suitable material.

Attached to one side or both sides of the support 1 is a dovetailed fillet or guide member 2, of wood or any suitable material, which is held in position by means of a groove 3, formed in one side thereof and into which the end of the support 1 fits snugly.

4 is a bracket or leg of any suitable material and form, but preferably of triangular form. A single bracket or one at each end of the support may be provided.

Secured on one side of the bracket 4 by means of screws or the like I provide a pair of cleats 5 and 6, which are located at a point near the upper edge of the bracket and parallel therewith or nearly so. A sufficient space is left between the cleats to form a groove or channel to receive the dovetail fillet 2 and permit the bracket to be moved to and fro on the member 2. The groove may be provided on both sides of the bracket, if desired.

In the present showing I have described the dovetailed member 2 as being independent of the support 1 and attached thereto; but, if desired, the edge of the support 1 may be rabbeted to be inserted in the groove of the bracket 4. The cleats 5 and 6 on the bracket 4 may be dispensed with and a groove or channel formed in the bracket itself and parallel or nearly so with the upper edge thereof to receive the dovetailed member 2.

When it is desired to employ my improved rest, a drawing-board or other support formed or provided with a dovetailed portion on one of its edges is attached to a bracket, as described, and by sliding the bracket the board is adjusted to the proper angle for the purpose desired.

Having thus described my invention, the following is what I claim as new therein and desire to secure by Letters Patent:

1. In a device of the character described, the combination of a book supporting board or member, having a continuous guide member along one edge, and a bracket or leg having an approximately transverse guiding groove movably engaging the guide member of the book supporting board or member.

2. In a device of the character described, the combination of a book supporting member having a dovetailed fillet forming a guide member along one edge, and a bracket or leg having an approximately transverse dovetail groove movably engaging the dovetail of said fillet.

3. In a device of the character described, the combination of a book-supporting member, a dovetailed member having a groove on one side adapted to receive one edge of said book-supporting member and an arm having a groove adjacent to and parallel with one end thereof, said groove being adapted to receive said dovetailed member for the purpose described.

4. In a device of the character described, the combination of a supporting member, a dovetailed member suitably secured to one edge of said supporting member and an arm having a groove adjacent to and parallel with one end thereof, said groove being adapted to receive said dovetailed member for the purpose described.

In testimony that I claim the foregoing as my invention I have signed my name, in presence of the subscribed witnesses, this 22nd day of May, 1907.

ARTHUR ENGLEFIELD.

Witnesses:

SAMUEL GODFREY SAUNDERS,
JAMES J. PURDEY.